United States Patent
Hills et al.

(10) Patent No.: US 10,336,657 B2
(45) Date of Patent: Jul. 2, 2019

(54) COMPOSITIONS AND METHODS FOR CURING CONCRETE

(71) Applicant: Advanced Concrete Technologies LLC, Orem, UT (US)

(72) Inventors: Dal N. Hills, Midway, UT (US); Kent Barrus, Provo, UT (US)

(73) Assignee: Advanced Concrete Technologies LLC, Orem, UT (US)

( * ) Notice: Subject to any disclaimer, the term of this patent is extended or adjusted under 35 U.S.C. 154(b) by 0 days.

(21) Appl. No.: 15/920,297

(22) Filed: Mar. 13, 2018

(65) Prior Publication Data

US 2018/0201547 A1    Jul. 19, 2018

Related U.S. Application Data

(62) Division of application No. 13/580,913, filed as application No. PCT/US2011/023239 on Jan. 31, 2011, now Pat. No. 9,914,668.

(60) Provisional application No. 61/299,880, filed on Jan. 29, 2010.

(51) Int. Cl.
| | |
|---|---|
| C04B 41/00 | (2006.01) |
| C04B 28/26 | (2006.01) |
| C04B 40/04 | (2006.01) |
| C04B 41/50 | (2006.01) |
| C04B 41/68 | (2006.01) |

(52) U.S. Cl.
CPC ............ *C04B 41/009* (2013.01); *C04B 28/26* (2013.01); *C04B 40/04* (2013.01); *C04B 41/5089* (2013.01); *C04B 41/68* (2013.01)

(58) Field of Classification Search
CPC ... C04B 41/009; C04B 41/68; C04B 41/5089; C04B 28/26; C04B 40/04
See application file for complete search history.

(56) References Cited

U.S. PATENT DOCUMENTS

| | | | |
|---|---|---|---|
| 4,239,540 | A | 12/1980 | Hsin-Chu |
| 5,316,847 | A | 5/1994 | Suominen |
| 5,512,619 | A | 4/1996 | DeWacker et al. |
| 6,187,382 | B1 | 2/2001 | Lightcap |
| 2002/0034650 | A1 | 3/2002 | Neely |
| 2002/0168477 | A1 | 11/2002 | Savin |
| 2005/0011416 | A1 | 1/2005 | Tollner |
| 2006/0048670 | A1 | 3/2006 | Al-Rashed |
| 2009/0162540 | A1 | 6/2009 | Golovkova et al. |
| 2011/0005431 | A1 | 1/2011 | Wantling |

OTHER PUBLICATIONS

International Searching Authority, United States Patent and Trademark Office, "International Search Report and Written Opinion," International application No. PCT/US2011/023239, dated Mar. 29, 2011.

International Searching Authority, United States Patent and Trademark Office, "International Preliminary Report on Patentability," International application No. PCT/US2011/023239, dated Jul. 31, 2012.

Li, X., et al., "UV-Shielding and Photocatalytic Properties of ZnO—CeO2—TiO2 Composite," Asian J. Chem., 26 (15):4566-70 (2014).

*Primary Examiner* — Robert S Jones
(74) *Attorney, Agent, or Firm* — Durham Jones & Pinegar, P.C., Intellectual Property Law Group

(57) ABSTRACT

A composition that may be used to retain moisture within fresh concrete as it cures to optimize the curing of the concrete may include one or more hardening and densifying agents (e.g., alkali metal polysilicate, colloidal silica, etc.) and one or more temporary moisture sealing agents (e.g., a wax, etc.). Additionally, such a composition may include a siliconate (e.g., a metal siliconate, such as an alkali metal siliconate like potassium methyl siliconate, etc.). The hardening and densifying agent of such a composition may penetrate the surface of fresh concrete to react with free lime, providing the fresh concrete with a strong surface. The temporary moisture sealing agent may form a moisture barrier on the surface of the fresh concrete to prevent moisture from escaping from the fresh concrete (e.g., evaporating, etc.) before the fresh concrete has sufficiently cured. The temporary moisture sealing agent may degrade within a matter of days (e.g., three days, seven days, 14 days, less than a month, etc.), facilitating its removal from the surface of the concrete once the concrete has cured and enabling further treatment of the surface without undue delay.

20 Claims, No Drawings

COMPOSITIONS AND METHODS FOR CURING CONCRETE

CROSS-REFERENCE TO RELATED APPLICATIONS

This application is a divisional of U.S. application Ser. No. 13/580,913, having a national stage entry acceptance date under 35 U.S.C. § 371(c) of Oct. 8, 2012, titled COMPOSITIONS AND METHODS FOR CURING CONCRETE, now U.S. Pat. No. 9,914,668, issued Mar. 13, 2018 ("the '913 Application"), which is a national stage entry of international application no. PCT/US2011/023239, filed on Jan. 31, 2010 and titled COMPOSITIONS AND METHODS FOR CURING CONCRETE ("the '239 PCT Application"), which included a claim for the benefit priority under 35 U.S.C. § 119(e) to the Jan. 29, 2010 filing date of U.S. Provisional Patent Application No. 61/299,880, titled COMPOSITIONS AND METHODS FOR CURING CONCRETE ("the '880 Provisional Application"). The entire disclosures of the '913 Application, the '239 PCT Application, and the '880 Provisional Application are hereby incorporated herein.

TECHNICAL FIELD

The present invention relates generally to compositions and methods for curing concrete and, more specifically, to compositions that hold moisture within concrete as the concrete cures, as well as to methods for retaining moisture within concrete as it cures. Specifically, the present invention includes compositions and methods in which a hardening and densifying agent is used in curing concrete, including, without limitation, concrete structures, such as slabs, pavement, runways and decks (e.g., bridges, parking structures, etc.).

BACKGROUND OF RELATED ART

Concrete typically includes cement, fly ash, and an aggregate (e.g., sand, limestone, gravel, etc.), among other possible components (e.g., chemical admixtures, etc.). When water is added to the cement, a chemical reaction known as "hydration" occurs between the cement and the water. The resulting cement gel or paste cures, or sets, to bind the other components of the concrete together. The longer the cement is exposed to water, the more complete and consistent (e.g., even) the hydration reaction throughout the concrete. Initially, the cement gel or paste is rigid, but not very strong. If water is removed from the cement gel or paste (e.g., by evaporation, etc.) before the cement gel or paste gains sufficient strength, the resulting structural changes to the concrete (e.g., shrinkage, etc.) may cause the cement and, thus, the concrete, to be undesirably porous, to crack, or to otherwise weaken. Accordingly, it is often desirable to maintain a suitable water, or moisture, content within fresh concrete until the cement gel or paste has had sufficient time to gain strength.

A number of techniques have been developed to maintain the moisture content of fresh concrete as the cement within the fresh concrete cures, or strengthens. One common technique involves trapping water within the fresh concrete by providing a moisture barrier on the exposed surfaces of the fresh concrete. Common moisture barriers include resinous (e.g., acrylic, etc.) concrete curing compositions. Unfortunately, many conventional resinous concrete curing compositions do not provide an aesthetically pleasing finished surface, and they are difficult to remove. Even so-called "self-dissipating" compositions, which typically degrade when exposed to ultraviolet (UV) radiation over long periods of time (e.g., 40 to 60 days or longer), leave finished concrete surfaces with aesthetically undesirable appearances and are difficult to remove when further surface treatment (e.g., hardening and densifying, polishing, application of sealers, etc.) is desired.

SUMMARY

The present invention includes compositions that may be used to retain moisture within fresh concrete as it cures to optimize curing of the concrete. For the sake of simplicity, the compositions of the present invention are referred to herein as being useful for curing concrete.

A composition suitable for curing concrete may include a hardening and densifying agent. Examples of such an agent include, but are not limited to, silicates. As used herein, silicates include polysilicates (e.g., alkali metal polysilicates, such as lithium polysilicate, sodium silicate, potassium silicate, etc.) and colloidal silicas. The ability of the hardening and densifying agent to reduce porosity in exposed surfaces of fresh concrete may, in effect, cause the fresh concrete to retain moisture for prolonged periods of time, which may enhance or even optimize curing of the fresh concrete.

In some embodiments, a composition of the present invention may consist of the hardening and densifying agent. In other embodiments, a composition may consist essentially of the hardening and densifying agent.

Other embodiments of compositions that are suitable for curing concrete in accordance with teachings of the present invention may include, or even consist essentially of, a hardening and densifying agent and a siliconate (e.g., a metal siliconate; an alkali metal siliconate, such as potassium methyl siliconate; etc.). In addition to hardening and densifying concrete, some siliconates are known to form polymeric films on surfaces to which they are applied. Such a polymeric film may enhance the ability of the hardening and densifying agent to trap moisture within fresh concrete.

Another embodiment of a composition of the present invention includes a temporary moisture sealing agent in addition to a hardening and densifying agent and, optionally, a siliconate. When such an embodiment of composition is applied to a surface of fresh concrete, the temporary moisture sealing agent forms a substantially confluent (i.e., substantially non-porous) film over the surface. A film formed by the temporary moisture sealing agent acts as a moisture barrier, preventing water from escaping the temporarily sealed surface on which the film has been formed. In some embodiments, a temporary moisture sealing agent may degrade within days (e.g., three days, seven days, 14 days, less than a month, etc.) of its application to a concrete surface, enabling self-dissipation or simplifying its removal from the surface, and enabling further treatment of the surface without any significant time delay after the concrete has sufficiently cured.

A composition that includes or consists essentially of any of the foregoing may also include one or more non-essential components. Without limiting the scope of the present invention, non-essential components may include pigments, surfactants and leveling agents.

Concrete curing systems that include separate components are also within the scope of the present invention. In some embodiments, such a concrete curing system may include one component that includes hardening and densifying agent and, optionally, a siliconate, while a separate component includes a temporary moisture sealing agent.

The present invention also includes various embodiments of methods for formulating and manufacturing compositions that may be used to cure concrete. In a manufacturing method, a hardening and densifying agent may be blended with one or more substances, such as a siliconate or a temporary moisture sealing agent, that will retain moisture within fresh concrete as the fresh concrete cures.

In addition, the present invention includes methods for curing concrete. Such a method includes applying a composition that includes a hardening and densifying agent to an exposed surface of the concrete. The hardening and densifying agent may be applied alone, or with one or more other substances that will retain moisture within the fresh concrete. As a non-limiting example, the hardening and densifying agent may be applied with a siliconate. As another example, the hardening and densifying agent may be applied with a temporary moisture sealing agent. In embodiments where the hardening and densifying agent is applied to a surface of fresh concrete along with another substance that retains material within the fresh concrete, application of the hardening and densifying agent may be effected before the other substance forms a film or barrier on the surface. In some embodiments, the hardening and densifying agent may be applied before the other substance, substantially concurrently with the other substance, or as part of the same composition as the other substance. In other embodiments, the hardening and densifying agent may be applied to the surface after the other substance, but before the other substance forms a barrier on the surface (e.g., polymerizes, agglomerates, etc.).

Other aspects, as well various other features and advantages of different aspects, of the present invention will become apparent to those of skill in the art through consideration of the ensuing description and the appended claims.

DETAILED DESCRIPTION

A composition that is suitable for preventing moisture from escaping fresh, curing concrete (i.e., for use in curing concrete) in accordance with teachings of the present invention, in various embodiments, includes a hardening and densifying agent. Some embodiments of such a composition further include a siliconate. In other embodiments, a composition of the present invention may additionally include a temporary moisture sealing agent.

The hardening and densifying agent of a composition of the present invention may comprise, consist essentially of or consist of a polysilicate. More specifically, the polysilicate may include a metal polysilicate. In even more specific embodiments, the metal polysilicate may comprise one or more alkali metal polysilicates, such as lithium polysilicate. The polysilicate may make up about 10% to about 20% of the total weight (i.e., w/w) of a composition of the present invention. These percentages are based upon the polysilicate-containing product used in the composition. As polysilicates are typically provided in liquid form, the percentages represent the amount of liquid, regardless of the solids content of that liquid, used in a composition of the present invention. In embodiments where LUDOX® lithium polysilicate is obtained from Grace Davison of Columbia, Md., the actual solids (i.e., lithium polysilicate) content of that product is about 20% solids, by weight (w/w), meaning that the actual lithium polysilicate content of a composition of the present invention is about 2% to about 4% of the total weight of the composition (i.e., about 10%×20% to about 20%×20%).

As an alternative to a polysilicate or mixture of polysilicates, the hardening and densifying agent of a composition that incorporates teachings of the present invention may include, consist essentially of or consist of a colloidal silica, such as a cationic amorphous silica. Like polysilicates, colloidal silicas are often obtained in liquid form. For example, the colloidal silica suspension available from Grace Davison as LUDOX® HSA has a silica content of 29.0% to 31.0%, by weight of the solution. Thus, a composition that includes that type of colloidal silica may have an actual colloidal silica content of about 2.9% w/w (i.e., about 10%×29.0%) to about 6.2% w/w (i.e., about 20%×31.0%).

Of course, compositions that include mixtures of different types of hardening and densifying agents, including different silicates, are also within the scope of the present invention.

In embodiments where a composition of the present invention includes a siliconate, the siliconate may comprise about 3% to about 6% of the weight of the composition. In some embodiments, the siliconate may comprise a metal siliconate. In more specific embodiments, the siliconate may comprise an alkali metal siliconate, such as potassium methyl siliconate. As an example, the potassium methyl siliconate of a composition of the present invention may comprise the "silane resin solution" available from Dow Corning Corporation of Midland, Mich., as XIAMETER® OFS 0777 SILICONATE. That solution has a solids content of 40% to 70% w/w. Thus, the actual potassium methyl siliconate solids may make up about 1.2% (i.e., about 3%×40%) to about 4.2% (i.e., about 6%×70%) of the weight of the composition.

Silicates and other hardening and densifying agents may facilitate curing of concrete without the need for subsequent removal, or requiring only a minimal removal effort (e.g., spraying with water, light brushing, etc.).

The temporary moisture sealing agent of the curing compound may be selected and/or configured to remain in place for a few days, and then be removed with little or no additional effort. It may eventually break down and dissipate once the fresh concrete has sufficiently cured. Examples of a temporary moisture sealing agent that may be used in various embodiments of compositions and methods that incorporate teachings of the present invention include, without limitation, materials that will degrade in a matter of days (e.g., three days, seven days, fourteen days, etc. In some embodiments, such a material may include a wax, such as a paraffin wax, a polyethylene wax, a scale wax or the like.

The temporary moisture sealing agent may be included in a composition in an amount that will enable it to form a substantially confluent film over a surface to which the composition is applied. In some embodiments, about 30% to about 60% of the weight of a composition may comprise a temporary moisture sealing agent. A specific, but non-limiting, example of a wax that may be used in a composition of the present invention is the paraffin wax available from Michelman, Inc., of Cincinnati, Ohio, as MICHEM® LUBE 743. That material has a solids content of 35% to 50%, which would equate to about 10.5% (i.e., about 30%×35%) to about 30% (i.e., about 60%×50%) of a composition of the present invention. In other embodiments, the temporary moisture sealing agent may comprise a scale wax, such as MICHEM® EMULSION 70750 or MICHEM® EMULSION 39235, both of which are available from Michelman, Inc.

A specific embodiment of a composition of the present invention includes (or may consist of) about 10% to about 20%, by weight, lithium polysilicate or colloidal silica; about 3% to about 6%, by weight, potassium methyl siliconate; and about 30% to about 60%, by weight, wax, with the balance (e.g., about 14% to about 69%, by weight) of the composition comprising water.

In other embodiments, a composition of the present invention may consist of a temporary moisture sealing agent, a hardening and densifying agent (e.g., a silicate and/or colloidal silica), and, optionally, water.

As an alternative to a wax, a variety of other membrane or film forming temporary moisture sealing agents may be used in a composition that incorporates teachings of the present invention. Non-limiting examples of other temporary moisture sealing agents include oils and oil based curing compounds, polyvinyl alcohol (PVA) based curing compounds, chlorinated rubber curing compounds, resin based curing compounds, and other materials and compounds that will form a temporary membrane or film over a surface of fresh concrete to seal moisture within the fresh concrete as it cures. Another embodiment of temporary moisture sealing agent includes water-soluble film-forming polymers, such as those described by U.S. Patent Application Publication 2009/0162540 of Golovkova, et al., the entire disclosure of which is, by this reference, hereby incorporated herein. Other materials, such as chloroparaffins, fatty acid triglycerides, alkyl sulfonic esters (e.g., phenols, cresoles, fatty acid esters, etc.), phthalates (e.g., dioctyl phthalate, dibutyl phthalate, benzyl butyl phthalate, etc.), polymers derived from glycerol, polymers derived from iso-cyanates or thio-cyanates (e.g., polyurethane, vegetable oil-extended polyurethane systems, moisture-curable polyurethane polymers, etc.), polymers derived from sulfur-containing reactants and polymers derived from silicon-containing reactants may be used as temporary moisture sealing agents.

In addition to the foregoing components, as well as various combinations thereof, one or more other components may also be included in a composition according to the present invention. Non-limiting examples of such components include surfactants, leveling agents and pigments. In embodiments where a hardening and densifying agent is mixed with a temporary moisture sealing agent, a surfactant may enable these two components to homogeneously or substantially homogeneously blend with one another. A leveling agent may facilitate spreading of a composition of the present invention over a surface of a substrate to be cured. A pigment may serve a variety of functions, including, without limitation, providing an identifier of the state of a substrate (e.g., an indicator that the substrate has not cured, etc.), light reflectance (e.g., when a white or other light colored pigment is used) and the like.

The present invention also includes methods for compounding a composition for use in curing concrete. In various embodiments, such a method includes providing a volume of water, blending at least one hardening and densifying agent into the volume of water, then blending at least one temporary moisture sealing agent into the volume of water. Blending may be effected using substances (e.g., the hardening and densifying agent and the temporary moisture sealing agent, etc.) that are already in solution (e.g., aqueous based substances, etc.).

In some embodiments, a siliconate or mixture of siliconates may be blended into the composition. The siliconate or siliconates may be added after the hardening and densifying agent has been mixed with the water and/or before the temporary moisture sealing agent is blended with the water and the hardening and densifying agent.

In a specific embodiment, a volume of water is provided that corresponds to about 14 percent to about 69 percent of a total weight of the desired finished composition. At least one hardening and densifying agent is then mixed into the volume of water, with the amount of the hardening and densifying agent being sufficient to comprise about 10 percent to about 20 percent of the total weight of finished composition. Thereafter, a sufficient amount of at least one siliconate may be blended into the mixture such that about three percent to about six percent of the total weight of the finished composition will comprise the at least one siliconate. Finally, at least one temporary moisture sealing agent is blended into the mixture. The amount of the temporary moisture sealing agent may be sufficient to comprise about 30 percent to about 60 percent of the total weight of the finished composition. The resulting composition may then be packaged, stored, and transported in any suitable manner known in the art.

In addition, the present invention includes methods for curing concrete. Such a method includes applying a composition that includes a hardening and densifying agent to an exposed surface of the concrete. The hardening and densifying agent may be applied alone, or with one or more other substances that will retain moisture within the fresh concrete. As a non-limiting example, the hardening and densifying agent may be applied with a siliconate. As another example, the hardening and densifying agent may be applied with a temporary moisture sealing agent. In embodiments where the hardening and densifying agent is applied to a surface of fresh concrete along with another substance that retains material within the fresh concrete, application of the hardening and densifying agent may be effected before the other substance forms a film or barrier on the surface. In some embodiments, the hardening and densifying agent may be applied before the other substance, substantially concurrently with the other substance, or as part of the same composition as the other substance. In other embodiments, the hardening and densifying agent may be applied to the surface after the other substance, but before the other substance forms a barrier on the surface (e.g., polymerizes, agglomerates, etc.).

As the hardening and densifying agent and the temporary moisture sealing agent may be applied separate, the present invention also includes concrete curing systems in which these components are separate from one another.

The ability of a composition or system of the present invention to retain moisture within fresh concrete were evaluated by a known technique—the ASTM C 156 (2005) test protocol from ASTM International. The ASTM C 156 (2005) is a test protocol titled "Water Retention by Liquid Membrane-Forming Curing Compounds for Concrete" that determines the ability of various compounds to prevent moisture from escaping fresh concrete. Generally, the tested composition was applied to finished surfaces of fresh concrete slabs and the weight loss of each sample was measured after a predetermined duration of time.

More specifically, "standard" mortar was mixed, "Standard" mortar includes ASTM C 150 Type I/II Portland cement, ASTM C 778 standard graded sand, and water. The water-to-cement ratio of the mixture was 0.4 and the sand-to-cement ratio of the mixture was 2.19. The average flow of the mixture, which was measured in accordance with the protocol set forth by ASTM C 87, was 40.

The mortar mixture was used to prepare three two inch thick square mortar specimens with 39.1 sq. in. top surfaces for the tested composition, and three more mortar specimens to serve as a control. The surface of each mortar specimen was steel troweled. The edges of each specimen were sealed with paraffin wax, providing a test surface with an area of about 36 sq. in.

Shortly after the edges were sealed, the test composition was applied, by brush, to the surfaces of three corresponding mortar specimens. The tested composition was applied to the surface of each of the three mortar specimens in an amount equivalent to one gallon per 400 sq. ft. Nothing was applied to the surfaces of the three mortar specimens that served as controls during the test. At this point, each mortar specimen was placed in a special controlled humidity chamber (with a temperature of 100°±2° F., a relative humidity of 32%±2%, and a water evaporation rate of 2 gal./hour) and weighed. The mortar specimens were then permitted to cure in the chamber for another 72 hours, at which point the weight of each mortar specimen was again determined. The final weighing indicated the weight loss, due to water evaporation, of each mortar specimen. The three weight loss numbers corresponding to each control and the three weight loss numbers corresponding to each tested composition were averaged, and the data that corresponded to the tested composition was compared to the data that corresponded to the control. The tested composition performed well within the parameters set by the test. Specifically, the tested composition exhibited an average mass loss of 0.45 kg/m$^2$ (0.092 lb/ft$^2$), which is well within the 0.55 kg/m$^2$ (0.113 lb/ft$^2$) mass loss limit set by ASTM C 156 (2005), indicating that a composition that incorporates teachings of the present invention is suitable for use in curing concrete.

Although the foregoing description contains many specifics, these should not be construed as limiting the scope of the present invention, but merely as providing illustrations of some embodiments. Similarly, other embodiments of the invention may be devised which do not exceed the scope of the present invention. Features from different embodiments may be employed in combination. The scope of the invention is, therefore, indicated and limited only by the appended claims and their legal equivalents, rather than by the foregoing description. All additions, deletions and modifications to the invention as disclosed herein which fall within the meaning and scope of the claims are to be embraced thereby.

What is claimed:

1. A method for curing concrete, comprising:
   applying a composition including at least one hardening and densifying agent blended with a temporary moisture sealing agent to a surface of fresh concrete, the at least one hardening and densifying agent entering pores in the surface of the fresh concrete, the temporary moisture sealing agent remaining substantially on the surface of the fresh concrete;
   curing the fresh concrete with the temporary moisture sealing agent on the surface and holding water within the fresh concrete; and
   reacting one or more materials of the at least one hardening and densifying agent with free lime at or near the surface of the fresh concrete to provide a hardened and densified surface,
   the temporary moisture sealing agent capable of breaking down and self-dissipating to facilitate its compete removal from the surface of the fresh concrete less than a month after its application as a film to the surface of the fresh concrete to expose the hardened and densified surface.

2. The method of claim 1, wherein applying the composition comprises applying the composition to a wet surface of the fresh concrete.

3. The method of claim 1, wherein applying the composition comprises adding moisture to the surface of the fresh concrete.

4. The method of claim 1, further comprising:
   removing the temporary moisture sealing agent from the surface of the fresh concrete.

5. The method of claim 4, wherein removing comprises at least one of brushing the temporary moisture sealing agent from the surface of the fresh concrete and spraying the temporary moisture sealing agent from the surface of the fresh concrete.

6. The method of claim 4, wherein removing is effected within about three days of applying.

7. A method for curing concrete, comprising:
   applying at least one hardening and densifying agent to a surface of fresh concrete; and
   applying at least one temporary moisture sealing agent to the surface while the at least one hardening and densifying agent is on the surface, the at least one temporary moisture sealing agent forming a film on the surface of the fresh concrete without substantially entering into pores in the surface of the fresh concrete.

8. The method of claim 7, wherein applying the at least one temporary moisture sealing agent to the surface of the fresh concrete comprises applying to the surface of the fresh concrete at least one temporary moisture sealing agent capable of breaking down and self-dissipating to facilitate its compete removal from the surface of the fresh concrete less than a month after its application.

9. The method of claim 7, wherein applying the at least one hardening and densifying agent to the surface of the fresh concrete comprises applying the at least one hardening and densifying agent to the surface of the fresh concrete in a manner that enables the at least one hardening and densifying agent to enter into pores of the fresh concrete.

10. The method of claim 7, wherein applying the at least one hardening and densifying agent and applying the at least one temporary moisture sealing agent are effected concurrently.

11. The method of claim 7, wherein applying the at least one hardening and densifying agent comprises applying the at least one hardening and densifying agent to the surface of the fresh concrete while the surface is wet.

12. The method of claim 7, wherein applying the at least one temporary moisture sealing agent comprises applying the at least one temporary moisture sealing agent to the surface of the fresh concrete while the surface is wet.

13. The method of claim 7, further comprising:
   removing the at least one temporary moisture sealing agent from the surface of the fresh concrete.

14. The method of claim 13, wherein removing the temporary moisture sealing agent from the surface of the fresh concrete comprises at least one of brushing the temporary moisture sealing agent from the surface of the fresh concrete and spraying the temporary moisture sealing agent from the surface of the fresh concrete.

15. A method for curing concrete, comprising:
   applying a composition including at least one hardening and densifying agent blended with a temporary moisture sealing agent to a surface of fresh concrete, the temporary moisture sealing agent remaining substantially on the surface of the fresh concrete without substantially entering into pores in the surface of the fresh concrete;

curing the fresh concrete with the temporary moisture sealing agent on the surface and holding water within the fresh concrete; and reacting one or more materials of the at least one hardening and densifying agent with free lime at or near the surface of the fresh concrete to provide a hardened and densified surface.

16. The method of claim 15, further comprising:
removing the temporary moisture sealing agent from the surface of the fresh concrete.

17. The method of claim 16, wherein the temporary moisture sealing agent is capable of breaking down and self-dissipating to facilitate its complete removal from the surface.

18. The method of claim 17, wherein the temporary moisture sealing agent is capable of breaking down and self-dissipating to facilitate its complete removal within a month of applying the temporary moisture sealing agent to the surface of the fresh concrete.

19. The method of claim 16, wherein removing the temporary moisture sealing agent from the surface of the fresh concrete comprises at least one of brushing the temporary moisture sealing agent from the surface of the fresh concrete and spraying the temporary moisture sealing agent from the surface of the fresh concrete.

20. The method of claim 15, wherein applying comprises applying the composition to the surface of the fresh concrete while the surface is wet.

\* \* \* \* \*